United States Patent
Khan et al.

(10) Patent No.: US 6,460,038 B1
(45) Date of Patent: Oct. 1, 2002

(54) SYSTEM, METHOD, AND ARTICLE OF MANUFACTURE FOR DELIVERING INFORMATION TO A USER THROUGH PROGRAMMABLE NETWORK BOOKMARKS

(75) Inventors: Umair Khan; Rizsan Tufail, both of Fremont; Christine Odero, Santa Clara, all of CA (US)

(73) Assignee: Clickmarks, Inc., Fremont, CA (US)

( * ) Notice: Subject to any disclaimer, the term of this patent is extended or adjusted under 35 U.S.C. 154(b) by 0 days.

(21) Appl. No.: 09/406,009

(22) Filed: Sep. 24, 1999

(51) Int. Cl.⁷ .................................. G06F 17/30
(52) U.S. Cl. ............ 707/10; 707/501.1; 707/511; 709/229; 709/245
(58) Field of Search ................. 707/10, 501.1, 707/511; 709/245, 229; 340/573.1; 345/327

(56) References Cited

U.S. PATENT DOCUMENTS

| | | | | |
|---|---|---|---|---|
| 5,813,007 A | * | 9/1998 | Nielsen ...................... 707/10 |
| 5,907,322 A | * | 5/1999 | Kelly et al. ................ 345/327 |
| 5,978,828 A | * | 11/1999 | Greer et al. ............... 709/2.24 |
| 6,032,162 A | * | 2/2000 | Burke ........................ 707/501 |
| 6,041,360 A | * | 3/2000 | Himmel et al. ............ 709/245 |
| 6,212,522 B1 | * | 4/2001 | Himmel et al. .............. 707/10 |
| 6,223,178 B1 | * | 4/2001 | Himmel et al. .............. 707/10 |
| 6,240,455 B1 | * | 5/2001 | Kamasaka et al. ......... 709/229 |
| 6,275,862 B1 | * | 8/2001 | Sharma et al. ............. 709/245 |
| 6,314,423 B1 | * | 11/2001 | Himmel et al. .............. 707/10 |
| 6,324,566 B1 | * | 11/2001 | Himmel et al. ............ 709/203 |
| 2001/0005171 A1 | * | 6/2001 | Farringdon et al. ...... 340/573.1 |
| 2002/0018078 A1 | * | 2/2002 | Khan et al. ................ 345/762 |

* cited by examiner

Primary Examiner—Charles L. Rones
(74) Attorney, Agent, or Firm—Silicon Valley IP Group, LLC.; Dominic M. Kotab

(57) ABSTRACT

A system, method, and article of manufacture are provided for programming an internet browser bookmark for delivering information to a user. A bookmark is created for forming a link to a web site to access the linked web site upon selection of the bookmark. Features are selected for the created bookmark relating to the linked web site. The selected features of the created bookmark are stored and then executed.

21 Claims, 10 Drawing Sheets

SYSTEM, METHOD, AND ARTICLE OF MANUFACTURE FOR DELIVERING INFORMATION TO A USER THROUGH PROGRAMMABLE NETWORK BOOKMARKS

CROSS-REFERENCE TO RELATED APPLICATIONS

This application is related to a U.S. patent application entitled "Method and Apparatus for Collaborative Remote Link Management Using Group Sharable Online Bookmarks" by inventors Umair Khan, Rizwan Tufail, and Christine Odero, filed on Sep. 24, 1999 under Ser. No. 09/405,533 (pending) and which is incorporated herein by reference in its entirety.

FIELD OF INVENTION

The present invention relates to internet browser bookmarks and more particularly pertains to creating and using multipurpose web channels and for creating user customized internet portals from programmable network bookmarks.

BACKGROUND OF THE INVENTION

Prior art network browser bookmarks (or browser favorites) as they exist today are simply saved links used to jump to sites (e.g., websites). Their sole function is to give one-click access to a user's favorite sites. They wait upon the user to click on them to trigger the sole event they generate—bringing up the website associated with them. There is no active intelligence or potential for information transfer associated with bookmarks.

Custom internet portals exist (e.g. myYahoo, myLycos etc.). The level of customization is however, fairly minimal. These portals only allow the user to customize the content delivered to them not the source of the content delivered. For example, if a user is interested in Indian politics, Soccer, Cricket, and Semiconductor High Tech companies, MyYahoo allows him to configure Yahoo's news source to filter through news on these topics. However, the user must take all this content strictly from Yahoo's content providers. This arrangement prohibits users from choosing not just the type of content but the source of the content as well. While, for example, a user may want to be able to receive world politics news from his two favorite Indian news dailies every morning, get his Hi-Tech news coverage from Red Herring and CNet, and get sports news from Cricket.org and dailysoccer.com, access to all these sites through a prior art internet portal would be predicated on the internet portal offering access to all of the particular site via that particular portal.

SUMMARY OF INVENTION

A system, method, and article of manufacture are provided for creating and using an internet browser bookmark for delivering information to a user. In the present invention, a bookmark is created to form a link to a web site so that access to the linked web site is granted upon selection of the bookmark. Features are selected for the created bookmark relating to the linked web site. The selected features of the created bookmark are stored and executed to generate notices to the user when a particular event relating to the linked web site occurs.

In an aspect of the present invention, the features may include an alarm feature where a date and time are set so that a notification is generated at the set date and time for reminding a user to access the linked web site. The features may also include a pushed update feature where a periodic interval for receiving updates is selected and then an arrangement is made with the linked web site for the transmitting of updates at the periodic interval.

In another aspect of the present invention, the features may include a pulled update feature where at least one keyword is selected. The linked web site is periodically monitored for the presence of the selected keyword so that a notification may be generated upon the detection of the selected keyword in the linked web site. The features may further include a content Be change detecting feature wherein the content of the linked web site is monitored for changes in the content and a notification is generated upon the detection of a change in the content.

In yet a further aspect of the present invention, the features may include a content delivery feature where content is extracted from the linked web site so that output which includes the extracted content may be generated. Additionally, the features may include a service delivery feature where sales information from the linked web site is extracted and wherein output is subsequently generated which includes the extracted sales information. Further, the created bookmark and output generated from the execution of the selected features may be displayed as part of a user customized internet portal.

DESCRIPTION OF DRAWINGS

The foregoing and other objects, aspects and advantages are better understood from the following detailed description of a preferred embodiment of the invention with reference to the drawings, in which.

DETAILED DESCRIPTION

Figure 1:
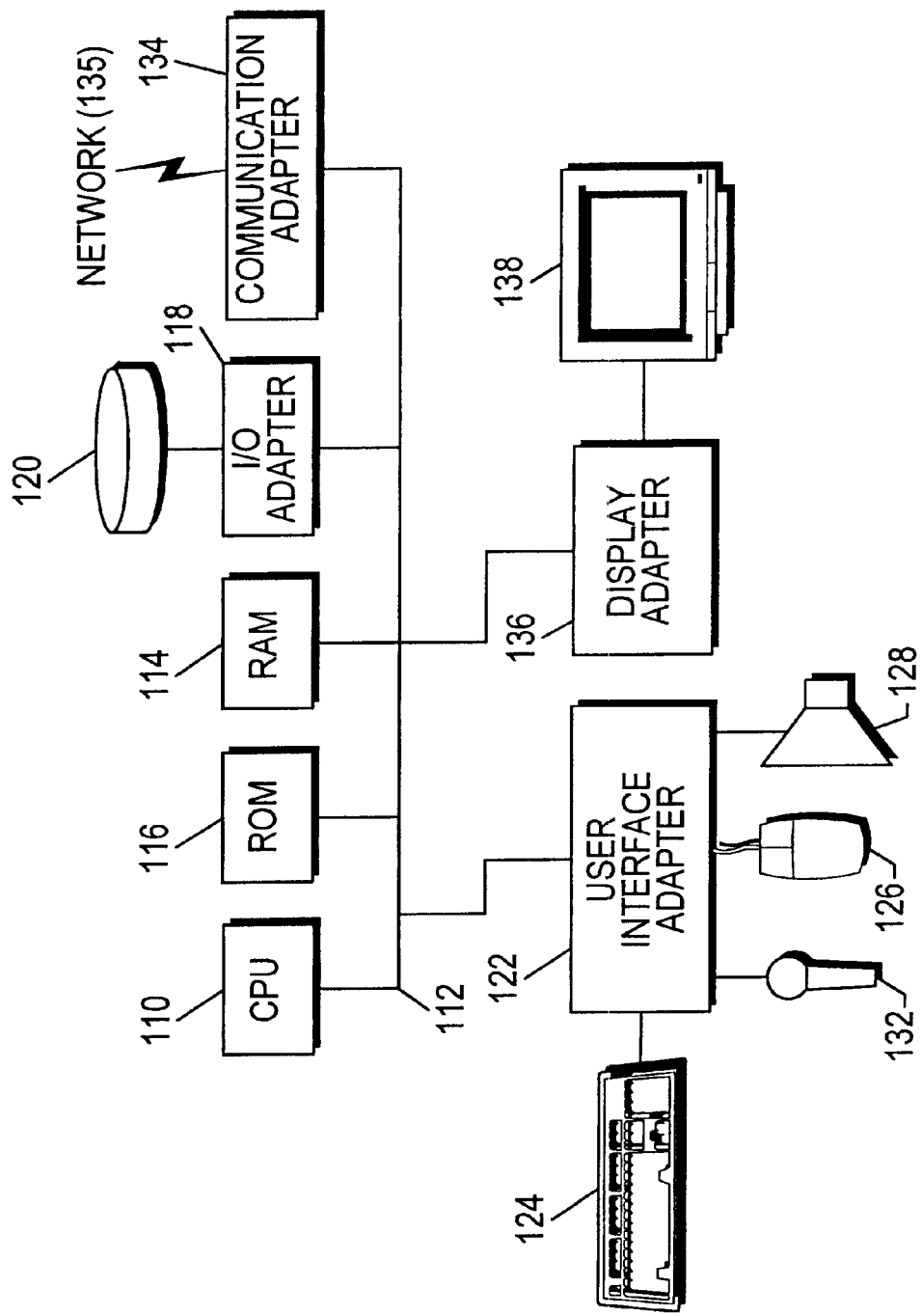
FIG. 1 is a schematic diagram of an exemplary hardware configuration in accordance with an embodiment of the present invention.

In accordance with at least one embodiment of the present invention, a system, method and article of manufacture are provided for programming an internet browser bookmark for delivering information to a user. The creating and use of such programmable bookmarks may be accomplished using a hardware implementation such as is illustrated in FIG. 1. Further, various functional and user interface features of the present invention may be enabled using software programming, i.e. object oriented programming (OOP).

Hardware Overview

FIG. 1 is a schematic diagram of one possible hardware implementation by which the present invention may be carried out. As shown, the present invention may be practiced in the context of a personal computer such as an IBM compatible personal computer, Apple Macintosh computer or UNIX based workstation.

A representative hardware environment is depicted in FIG. 1, which illustrates a typical hardware configuration of a workstation in accordance with one embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network 135 (e g., a data processing network) and a display adapter 136 for connecting the bus 112 to a display device 138.

The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on other platforms and operating systems.

Software Overview

A preferred embodiment of the present invention is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine, its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that one can call when one wants those individual behaviors in a program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language —2.0" (November 1995); and R. Fielding, K Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;
a Restricted user interface capabilities;
Can only produce static Web pages;
Lack of interoperability with existing applications and data; and
Inability to scale.

Sun Microsystem's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet". Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets". Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution".

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta". ActiveX Technologies also includes ActiveX Server Framework, allowing developers to create server applications. One of ordinary skill in the art readily recognizes that ActiveX could be substituted for JAVA without undue experimentation to practice the invention.

Online Bookmarks

Computers may be connected into networks. Within such networks, computers are often designated as clients interacting with other computers known as servers. Note that a server may act as a client in relationship with another server. For example, a server may be a client of an internet domain name server. Client prior art computers are characterized as being smaller computers than servers. Servers often possess very high bandwidth external communications interfaces with very large local mass storage. A client computer may have a telephone line or T1 ethernet link to a network, whereas servers usually start with one or more T1 links, and can be found servicing gigabit ethernet external communications protocols.

Most websites are situated on servers. The core content of most small to mid-size "jump-station" sites is a set of links related to the site's theme: e.g., a site focusing on East European political news may consist largely of links to east European news sites). Similarly most personal homepages at web communities (e.g., Geocities, Xoom, AngelFire, etc.) are basically a set of links to the individual's favorite web sites. Maintaining these sites requires adding new links regularly: webmasters, homepage owners must login or Telnet/ftp to the site to add/edit links.

Figure 2:
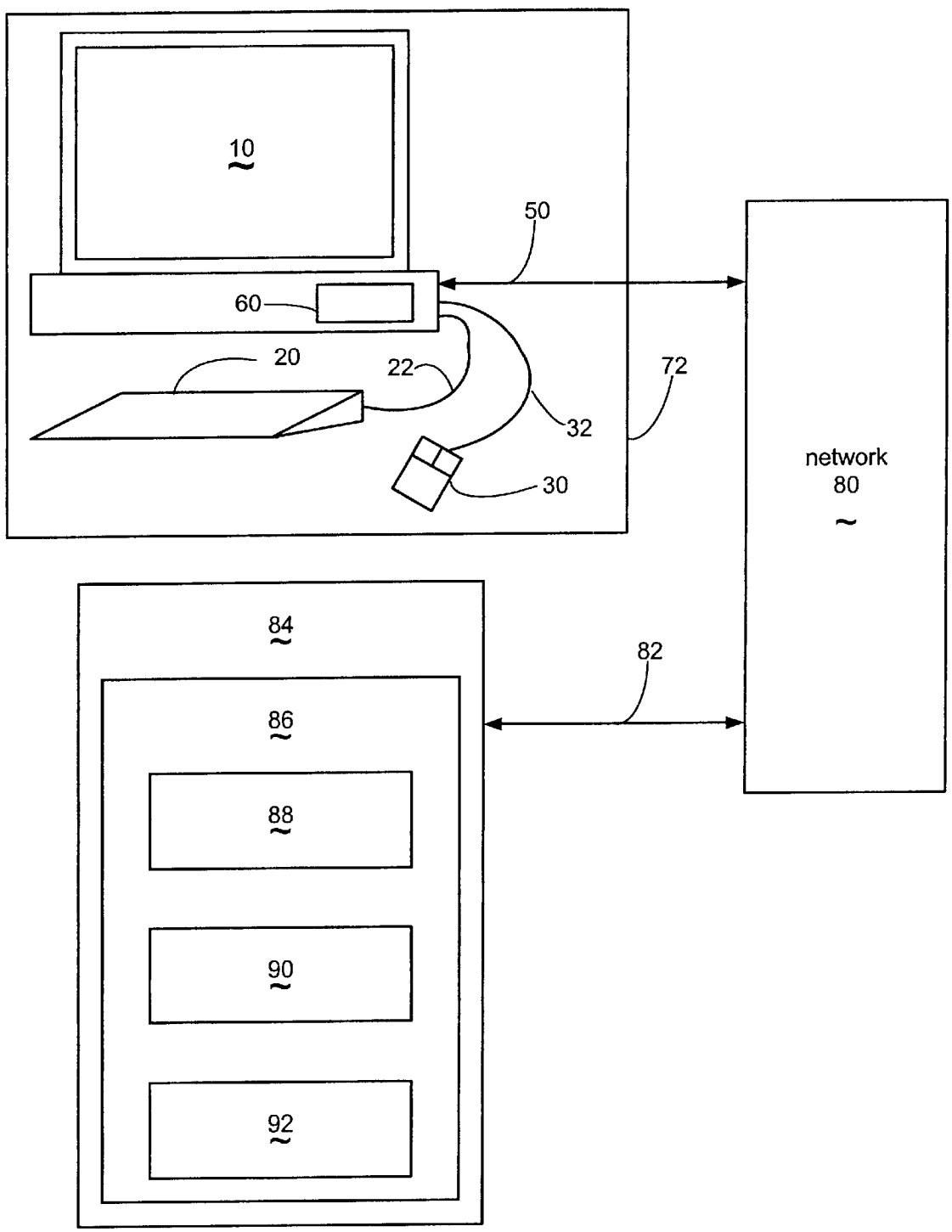
FIG. 2 is a schematic system block diagram in accordance with an embodiment of the present invention.

FIG. 2 is a system block diagram in accordance with an embodiment of the present invention. The upper left hand corner of this diagram depicts a client computer 72 showing a display device 10, keyboard 20 with keyboard physical transport 22, selector device 30 with selector device physical transport 32, external communication physical transport 50 and local mass storage 60. Note that this diagram has been provided by way of illustration, multiple client computers may be coupled in an actual system embodying this invention. The client computer 72 is coupled to a network 80 by its external communication physical transport 50. The network is further coupled by arrow 80 to server 84. Server 84 local mass storage 86 further contains programs 88 and user account information 90 and a collection of bookmark nodes 92.

Bookmark nodes as used herein refer to bookmark links as well as folders for bookmark links and sub-folders of bookmark folders.

Embodiments of the present invention include online bookmarks 92 on a server 84. Such embodiments provide a method of maintaining a jumpstation website collaboratively. Further embodiments include remote management of bookmarks 92 online. Other embodiments of the present invention may include remote management of online bookmarks 92 residing on a server 84 by identified web users on client computers 72. Using group sharable online bookmarks sets up an innovative method of maintaining a jumpstation website collaboratively.

To maintain the links remotely (i.e. without logging into the site each time a link needs to be added), The user of the online bookmark account is setup with a mechanism allowing them to, while surfing the web, add any site they visit, directly to the bookmarks account. In one embodiment, a special bookmark may be setup in the user's local (browser-based) bookmarks on a client computer 72 residing in local mass storage 60. This special bookmark is in fact not the URL of a website but a call to the server 84 which houses the users online bookmarks 92. When the user arrives at a website he would like to add to his bookmarks account, he simply selects the special bookmark in his local browser on client computer 72. This bookmark calls the server 84 with the location (URL) of the website currently being visited. The URL then gets added to the online bookmarks account 90 and folder 92.

In another embodiment a small utility is downloaded from the server 84 program store 88 to the user's client computer 72 local mass storage 60. While surfing the web, clicking on the icon shown in display 20 for this utility would look up the user's browser's history buffer and determine which website the user is currently visiting. It would then generate a call to the server 84 hosting the users bookmarks account 90 with the URL of the currently accessed website. This website would then get added to the online bookmarks set 92. Note that in either embodiment, the user does not have to log in to the online bookmarks account 90 to actually add a new bookmark.

Programmable Bookmarks

The present invention involves a new web object, a "programmable bookmark". The programmable bookmark may be used as multipurpose channels capable of delivering web updates, content and services to users, and how to construct a truly custom Internet portal using these active bookmark channels. With programmable bookmarks, an online bookmarks management site may act as intermediaries in this information flow, allowing users to get the content they want without exposing their personal information (e.g., e-mail, etc.) to other websites.

For purposes of the present description, it should be understood that references to the Internet and World Wide Web encompass intranet system and that references to websites encompasses similar network sites including intranet sites.

Traditionally, Netscape bookmarks or IE favorites are passive objects—links that need to be clicked on to jump to a particular universal resource locator (URL). However, programmable bookmarks are web objects capable of storing properties, triggering events and communicating information to the user. For example, programmable bookmarks may be the basis of channels between users and websites and user customizable Internet portals.

Figure 3:
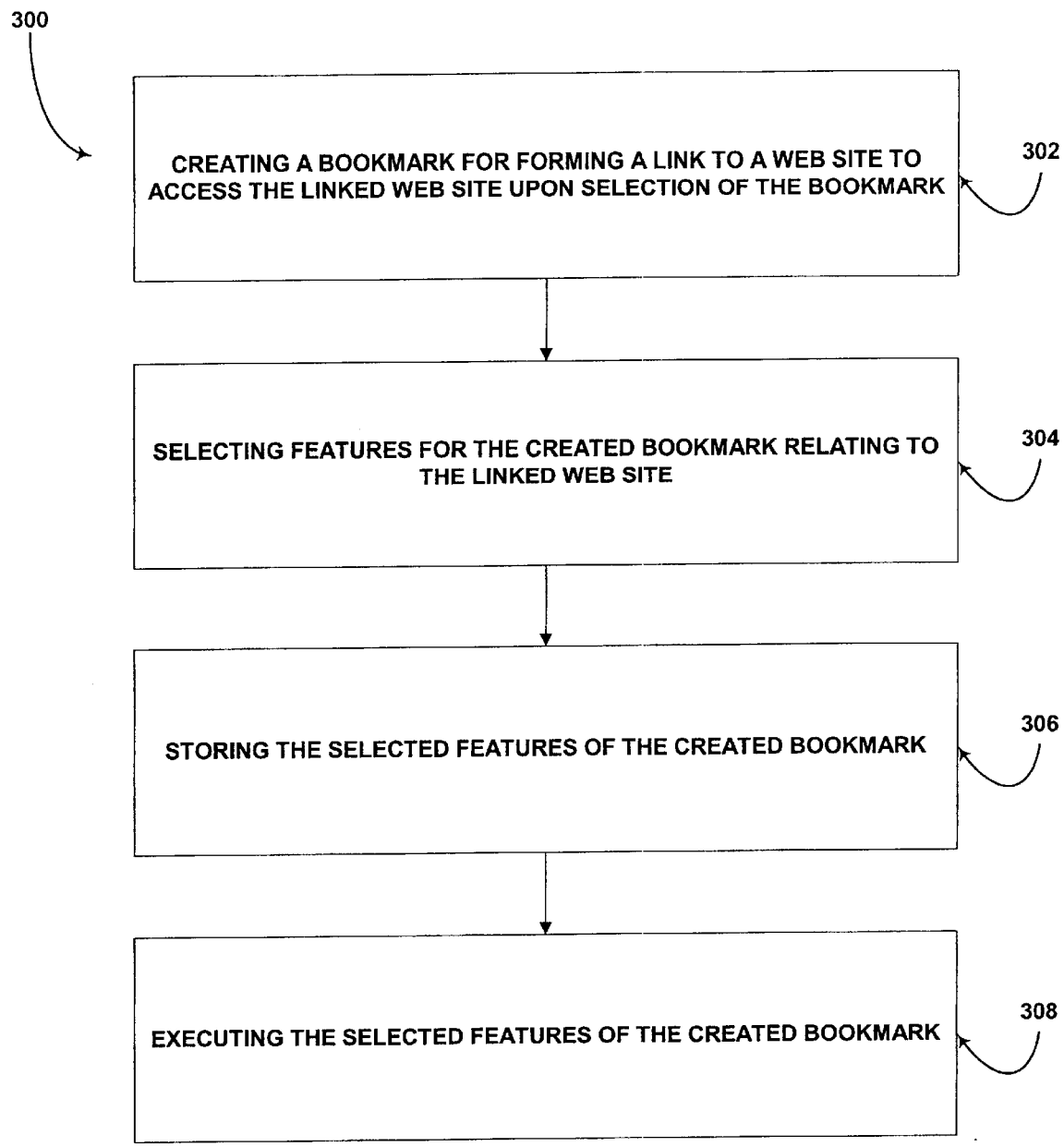
FIG. 3 shows a flowchart for a method programming and using an network browser bookmark to deliver information to a user in accordance with an embodiment of the present invention.

FIG. 3 illustrates a flowchart 300 for programming and using an network browser bookmark to deliver information to a user. First, in operation 302, a bookmark is created to form a link to a site so that the linked site is accessed upon selection of the bookmark. Features for the created bookmark are then selected relating to the linked site in operation 304. The selected features of the created bookmark are then stored and executed by an online bookmark manager to carry out the particular feature (see operations 306 and 308).

Programmable Channels to Websites

The following are some illustrative features for created bookmarks according to embodiments of the present invention:

1. Alarmed Bookmarks:

An embodiment of the present invention may include an alarm feature. With this feature, execution of the selected features includes the setting of a date and time and then subsequently generating a notification at the set date and time for reminding a user to access the linked web site. With this feature, users are able to alarm their bookmarks to "ring" at a specified date and time. Thus, if a user wants to revisit a site in the future (to check sweepstake results, etc.), he can alarm the bookmark for that site in his bookmarks account. At the appointed time, the user will be notified (via email and/or visual cues in his bookmark set) of his "appointment" with the web site.

Figure 4:
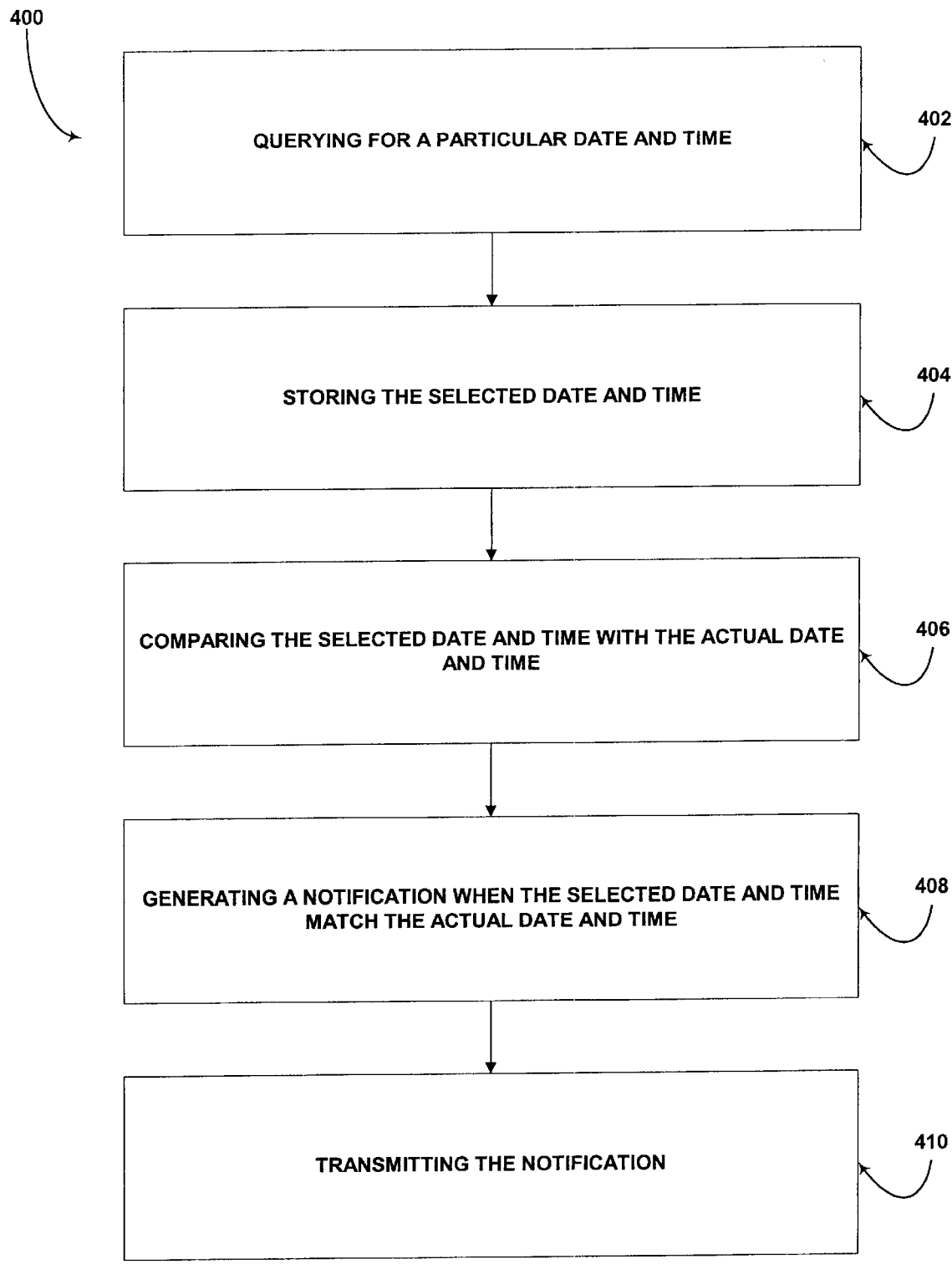
FIG. 4 illustrates a flowchart for a method for conducting an alarm feature of a programmable bookmark in accordance with an embodiment of the present invention.

FIG. 4 illustrates a flowchart for the alarm feature of a programmable bookmark. Specifically, upon selection of the alarm feature 400, a user is first queried for a particular date and time that the user would like to be reminded to visit the website linked to the selected bookmark in operation 402. The selected date and time are then stored in memory in operation 404. Subsequently, the selected date and time are compared to the actual date and time in operation 406. When the selected date and time match the actual date and time, a notification is generated and transmitted in operations 408 and 410 to the user to remind the user to visit the website associated with the bookmark having the alarm feature selected.

2. "Pushed" Web site Updates:

Another feature that may be included is an pushed update feature. With the pushed update feature, execution of the selected features comprises selecting a periodic interval for receiving updates and then arranging with the linked web site for the transmitting of updates at the periodic interval. Users are able to receive updates from their favorite web sites via their bookmarks. Users may be able to do so without divulging their email address to each of their favorite web sites. The user's online bookmarks manager make arrangements with web sites to "push" regular site updates and announcements to users and will relay these updates to all users interested in the web site. Users simply program a bookmark with the frequency at which they want the updates.

Figure 5:
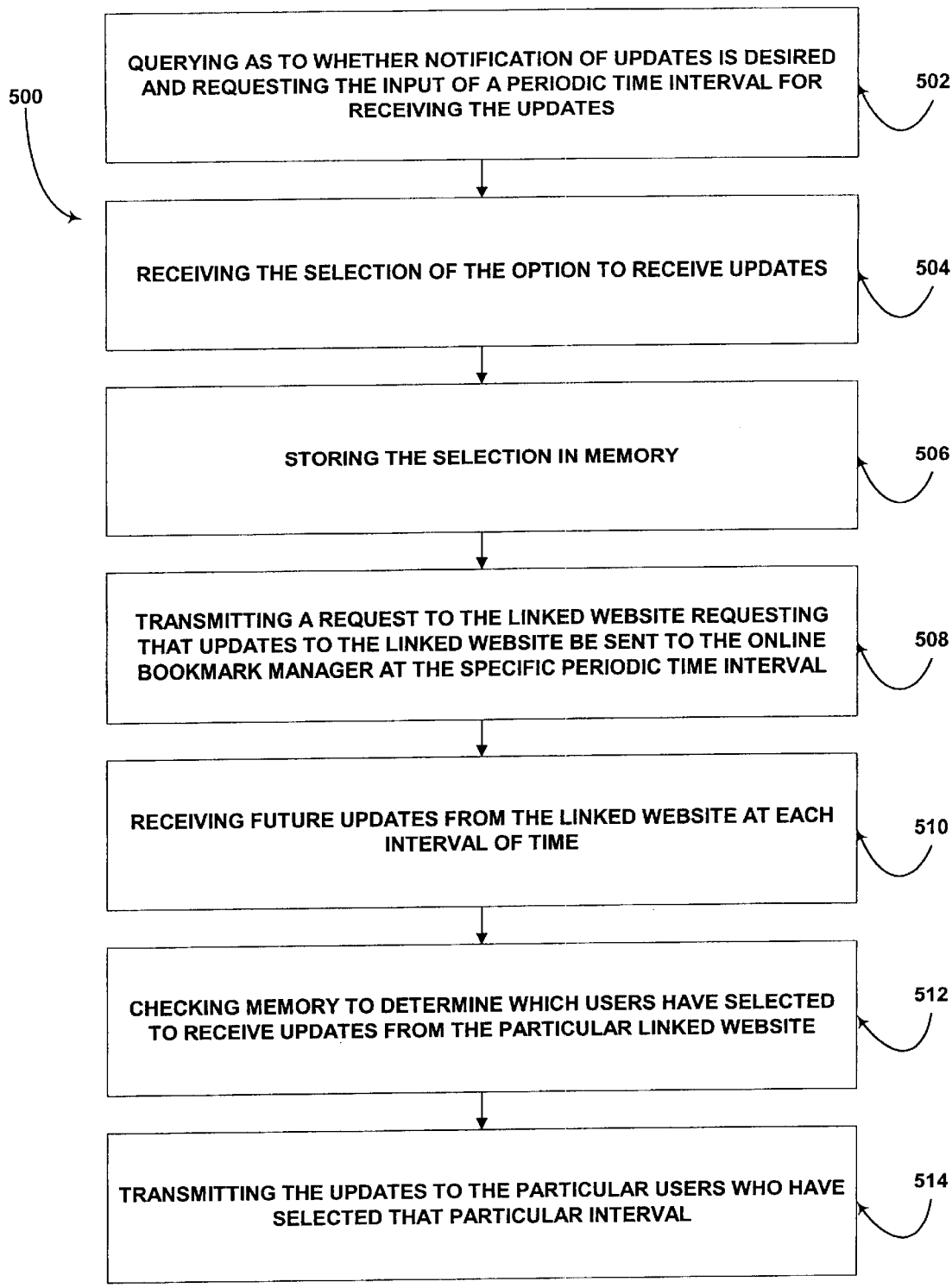
FIG. 5 illustrates a flow diagram of a method for conducting the pushed update feature in accordance with an embodiment of the present invention.

FIG. 5 illustrates a flow diagram of a method 500 for the pushed update feature. In further detail, in an embodiment of the present invention, the subsequent selection of the pushed update feature, the online bookmarks manager may first query the user as to whether the user would like to be notified of updates from the website linked to the selected bookmark and also to input a periodic time interval that the user would like to receive regular updates from the linked web site in operation 502. Upon the receipt of the selection of the option to receive updates from the linked website in operation 504, the selection is stored in memory in operation 506. The online bookmark manager also transmits a request to the linked website requesting that updates to the linked website be sent to the online bookmark manager at the specific periodic time interval selected by the user in operation 508. Subsequently, when the online bookmark manager receives future updates from the linked website at each interval of time selected by the user, the online bookmark manager first checks the memory to determine which users have selected to receive updates from the particular linked website in operations 510 and 512 and then transmits the updates to the particular users who have selected that particular interval in operation 514.

3. "Pulled" Web site Updates:

The features of the present invention may also include a pulled update feature where at least one keyword is first selected. The linked web site is then periodically monitored for the presence of the selected keyword. When the keyword is detected in the liked web site, a notification to the user is generated. With this feature, instead of receiving any and all site updates, users may also program their bookmarks to "poll" their favorite sites. Users are able to associate a set of keywords with each bookmark. The bookmarked sites is be polled by the online bookmarks manager for the appearance of these keywords. For example, the user may associate the Keywords "Indiana, Cricket, Cisco" with cnn.com, a bookmark in his online bookmarks account. The online bookmarks manager will monitor the front page of cnn.com and should any of these words appear there, the user would be immediately informed—an efficient way of tracking relevant news and events without having to scour dozens of news sources.

Figure 6:
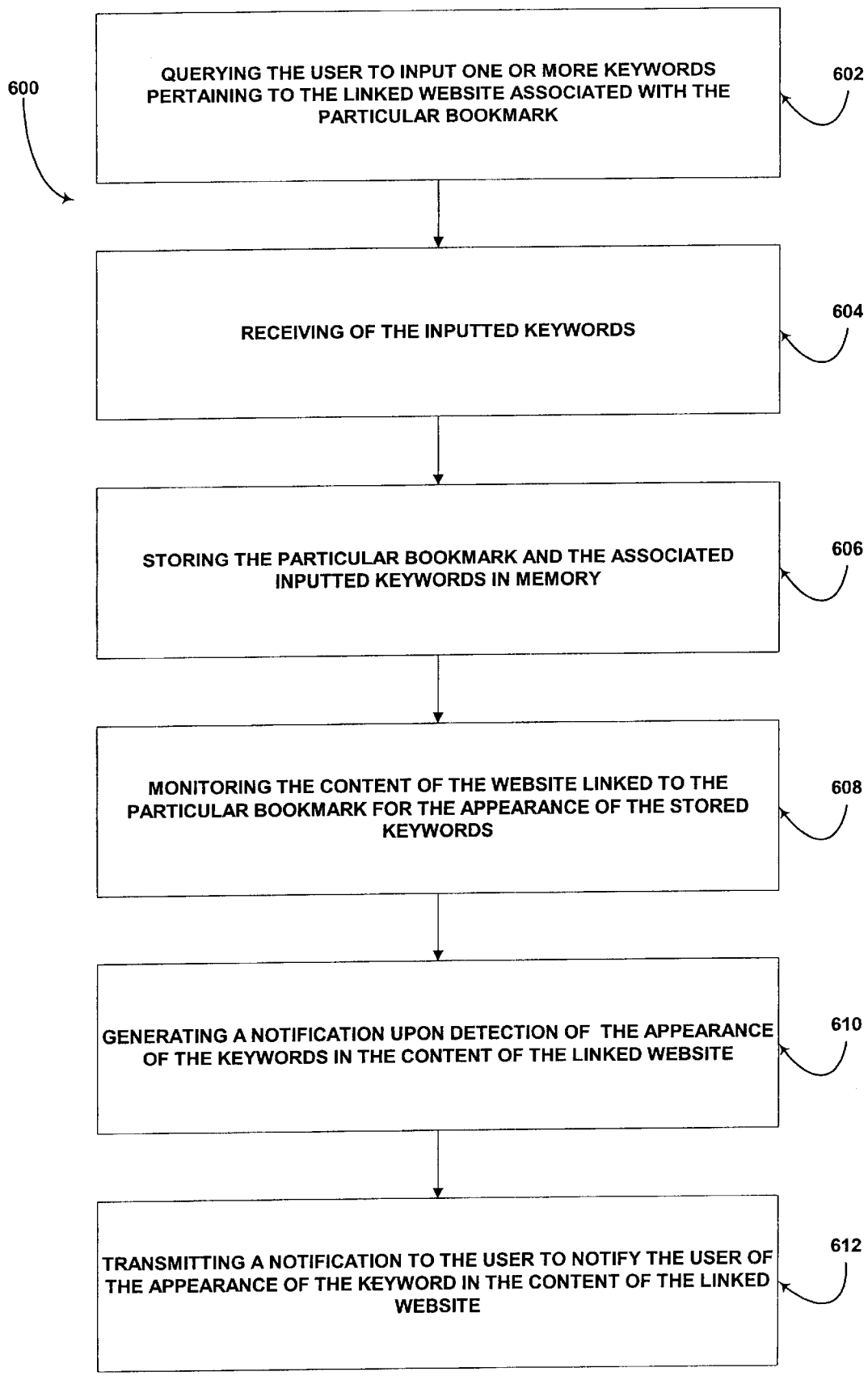
FIG. 6 illustrates a flowchart for a method of conducting the pulled update feature in accordance with an embodiment of the present invention.

FIG. 6 illustrates a flowchart for a method 600 of conducting the pulled update feature. In closer detail, upon selection of the pulled update feature, the online bookmark manager first queries the user to input one or more keywords pertaining to the linked website associated with the particular bookmark in operation 602. Upon receipt of the inputted keywords, the online bookmark manager stores particular bookmark and the associated inputted keywords in memory in operations 604 and 606. The online bookmarks manager then monitors the content of the website linked to the particular bookmark for the appearance of the stored keywords in operation 608. When the online bookmarks manager detects the appearance of the keywords in the content of the linked website, the online bookmarks manager generates and transmits a notification to the user to notify the user of the appearance of the keyword in the content of the linked website in operations 610 and 612.

4. Content Change Detection:

Another feature that may be include in an embodiment of the present invention is a content change detecting feature. With this feature, content of the linked web site is monitored for changes in the content and a notification is generated upon the detection of a change in the content. This feature is particularly useful for sites whose content may not change regularly and any change at all is of special interest to a user. In such cases the user programs the site bookmark to notify the user whenever any change occurs. Such functionality is especially relevant in tracking a competitor's corporate site (for product offerings, etc.), monitoring academic/research material web sites, event announcement pages, or any site whose updates are infrequent and irregular.

Figure 7:
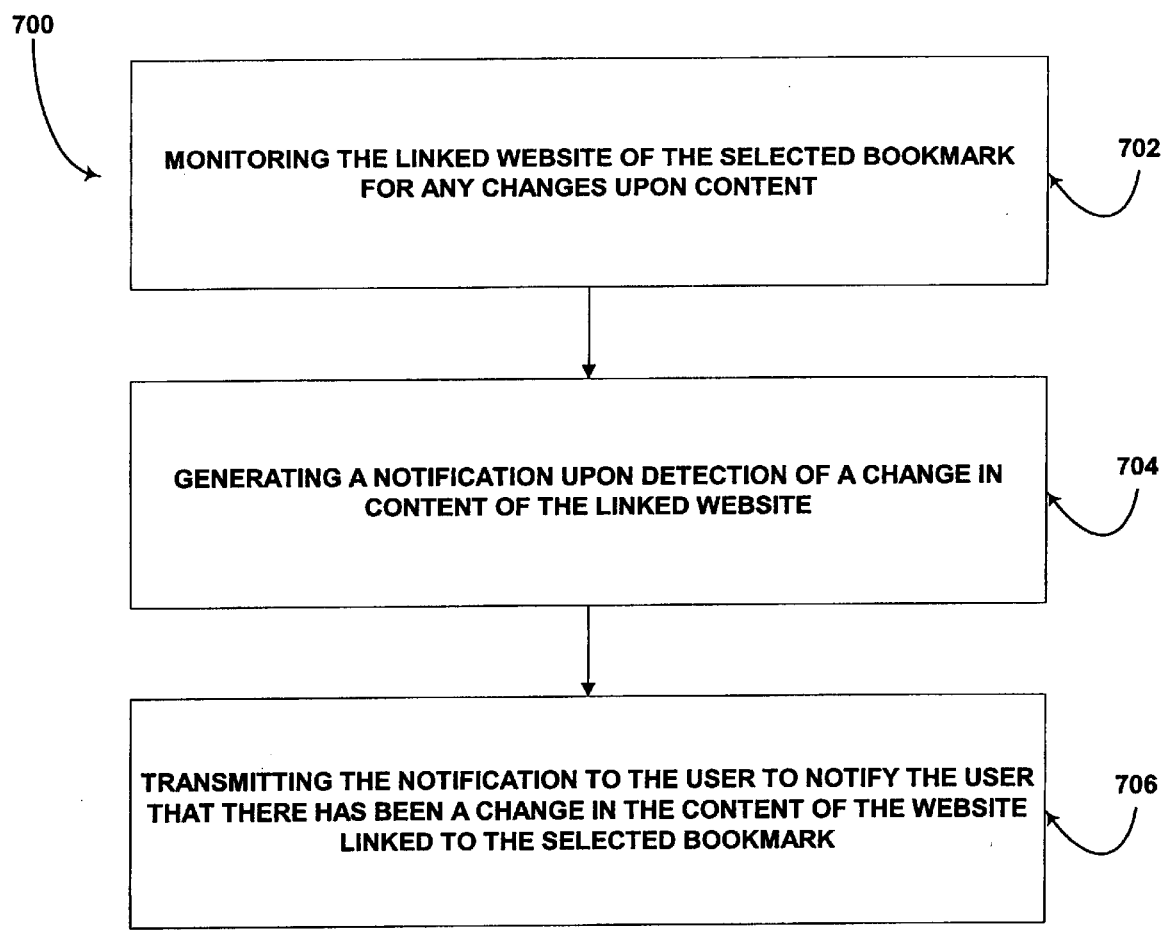
FIG. 7 illustrates a flowchart for a method for executing the content change detecting feature in accordance with an embodiment of the present invention.

FIG. 7 illustrates a flowchart for a method 700 for executing the content change detecting feature. Specifically, in execution of this feature, the online bookmarks manager monitors the linked website of the selected bookmark for any changes upon content in operation 702. When the online bookmarks manager detects a change in content of the linked website, the online bookmarks manager then generates and transmits a notification to the user to notify the user that there has been a change in the content of the website linked to the selected bookmark in operations 704 and 706.

5. Web Content Delivery:

An additional feature that may be included in the present invention is a content delivery feature. With this feature, content from the linked web site is extracted so that output which includes that extracted content may be generated and sent to the user. With this feature, programmable bookmarks may be used to deliver content (news, articles, financial information) to the user. Users may program any bookmark within their bookmark set to deliver its content (or portion of content) to them either in a browser based custom portal or via email.

Figure 8:
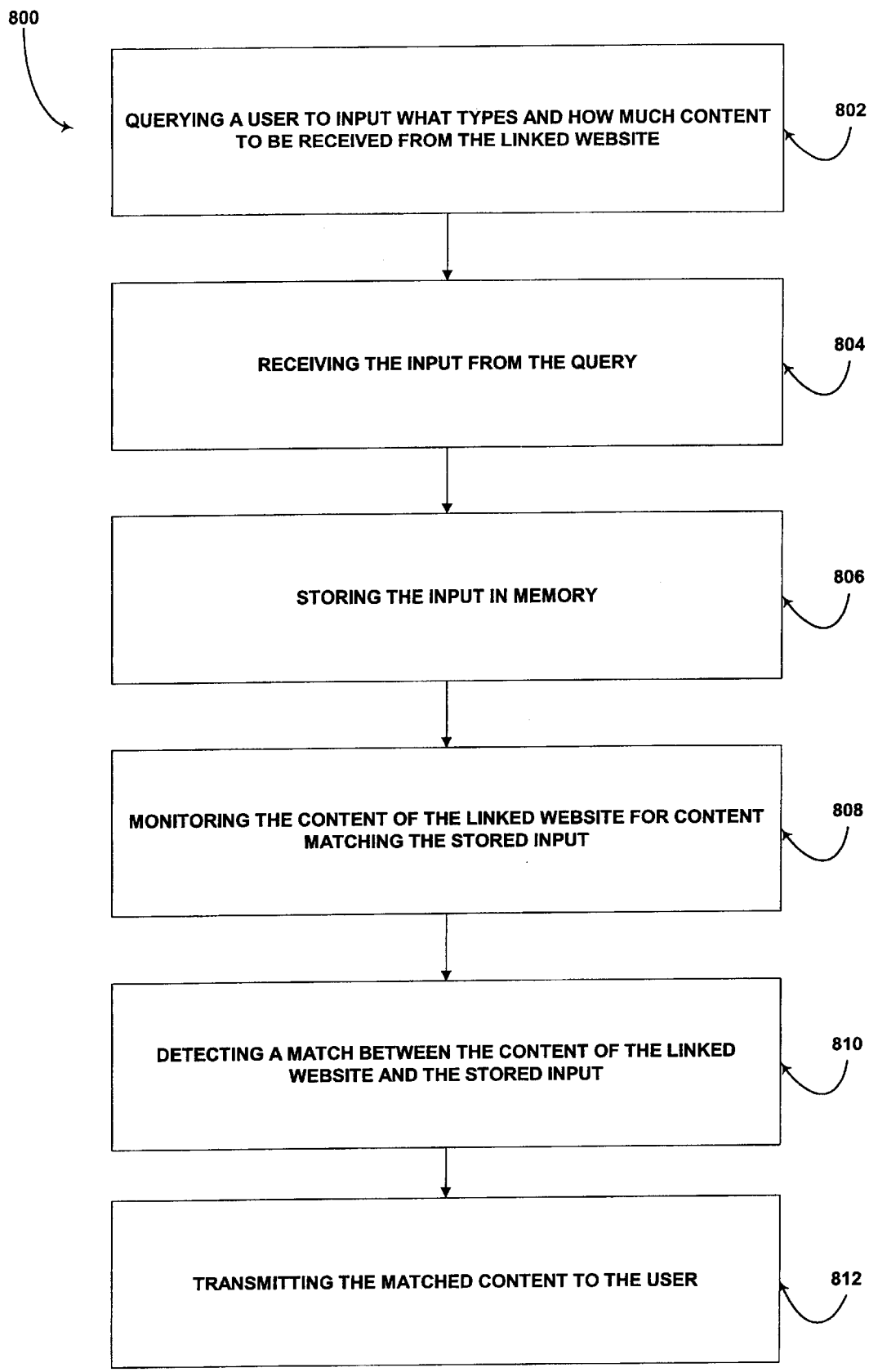
FIG. 8 illustrates a flowchart for a method for the conducting of a content delivery feature in accordance with an embodiment of the present invention.

FIG. 8 illustrates a flowchart for a method 800 of the conducting of a content delivery feature. Upon selection of this feature, the user may be queried to input what types and how much content (i.e., information) from the linked website the user would like to receive in operation 802. Upon receipt, the online bookmarks manager may then store in memory the input from this query in operations 804 and 806. In operation 808, the online bookmarks manager may then monitor the content of the linked website for content matching the stored input. When the online bookmarks manager detects a match between the content or portion thereof of the linked website and the stored input in operation 810, the online bookmarks manager may then transmit the matched content to the user in operation 812.

6. Web Service Delivery (e.g. E-Commerce):

An embodiment of the present invention may also include a service delivery feature. With this feature, sales information is extracted from the linked web site and output which includes the extracted sales information is generated to be sent to the user. With this particular feature, programmable bookmarks serve as an excellent conduit for information between web sites and its visitors to not just cover site updates and content (content marketing) but also cover services such as E-Commerce (product marketing) is another application. With this feature, programmable bookmarks serve as the relay in the E-Commerce chain so that users are able to get E-Commerce opportunities (sales/ auction info) without having to go shopping on several sites and without having to give their email address and other contact information to several Internet merchants. Relay-E-Commerce may take place as communiques placed in an online bookmarks user's account (in a custom portal view for example) or via email.

Figure 9:
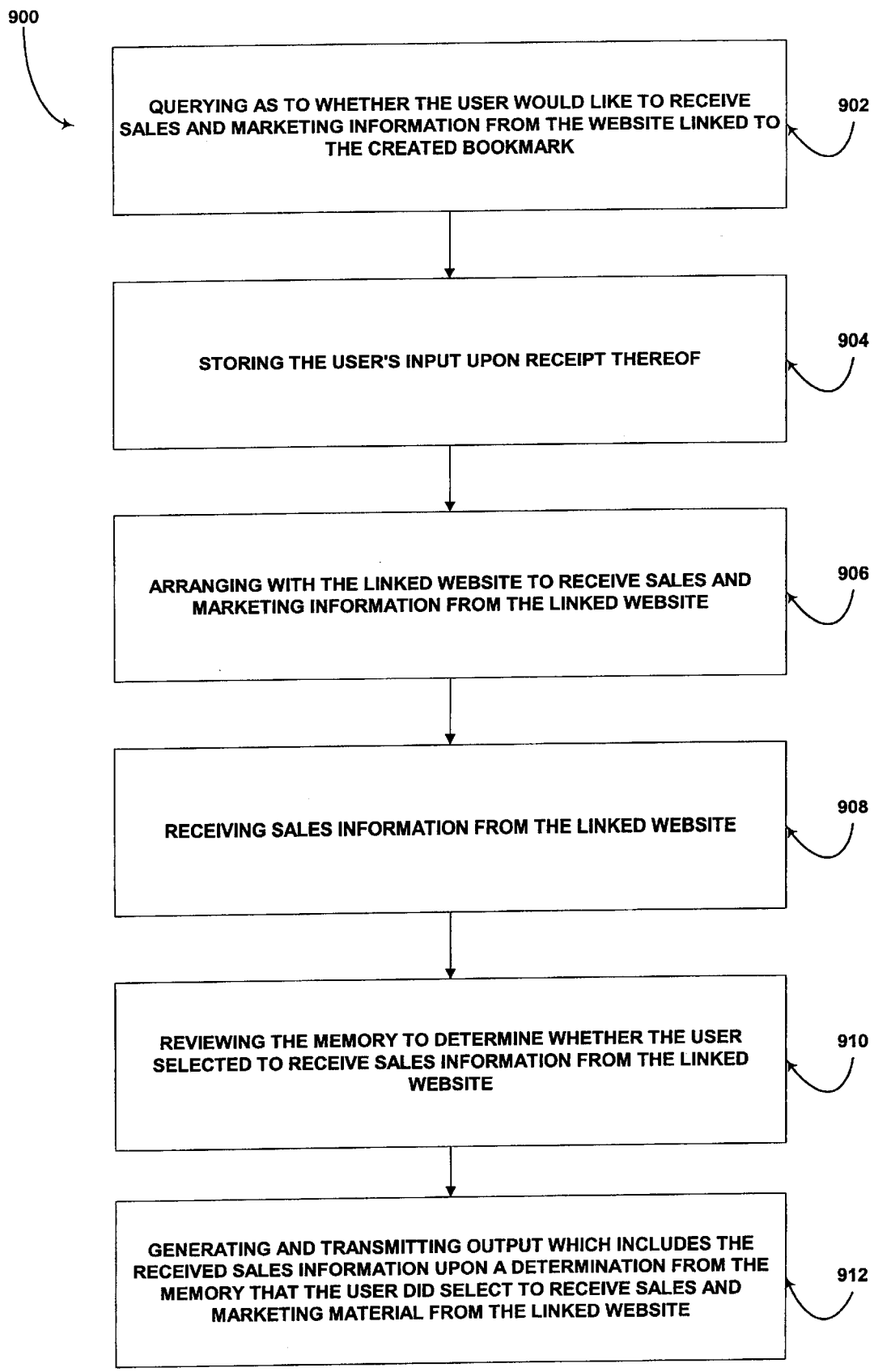
FIG. 9 illustrates a flowchart for a method for conducting the service delivery feature in accordance with an embodiment of the present invention.

FIG. 9 illustrates a flowchart for a method 900 for conducting the service delivery feature. In closer detail, according to one embodiment of the present invention, upon selection of the service delivery feature, the user may be queried as to whether the user would like to receive sales and marketing information from the website linked to the created bookmark in operation 902. Upon receipt, the user's input is then stored in memory in operation 904. The online bookmarks manager then may then arrange with the linked website to receive sales and marketing information from the linked website in operation 906. After the online bookmarks manager receives sales information from the linked website in operation 908, the online bookmarks manager then reviews the memory to determine whether the user selected to receive sales information from the linked website in operation 910. If the online bookmarks manager determines from the memory that the user did select to receive sales and marketing material from the linked website, then the online bookmarks manager may generate output (such as an e-mail) which includes the received sales information and transmit the output to the user in operation 912.

Useful to the programmable bookmark concept is the server side back-end support needed to interface with websites in creating these channels to users. The mechanism for accessing websites for content change detection for instance may require the keeping of a hashed value of the web page content and spider the site periodically and compare the content against the previously hashed value. Delivering the updates, contents and services requires an efficient mechanism to deliver this to the end user. All such content may be stored on the online bookmark managers server and relayed via email or directly on the browser through a custom portal view.

Property Retention on Bookmarks

Bookmarks as object capable of being programmed is a powerful paradigm. One significant extension this principle is the concept of property retention on bookmarks. We can associate properties with bookmarks that enhance the users web surfing and bookmark management experience.

1. Expiration date: A user may specify at the time she bookmarsk a webpage, if she wishes the bookmark to be automatically purged after a certain period of time. This property is particularly relevant for event based sites (that are innately temporary sites related to a major corporate, sports, political or social event) as well as for sites whose interest for you is likely to be short-lived 2. Login Information: There are a myriad login/password pairs that one has to remember to access all membership based sites. The ability to attach a site's login information to its bookmark is hence an incredibly useful function. Users will be able to specify all the login information and store alongside their bookmark in a server side bookmark account. This way they only have to remember 1 login ID (to their entire bookmark account) to access all their individual website logins.

3. Auto Login: Programming a bookmark such that when you click an icon associated withthat bookmark not only are you taken to the site but automatically logged in as well with the "bookmark" doing the work of filling in the login form with the username and password associated with that website. The mechanism involved in setting up an autologin property on a bookmark would require the user to log in to the bookmarked website while a server side script (written in Java, C, Perl, or JavaScript) watches in the background. The script records the response generated when the user enters his login information at the webpage and stores the "post-login" URL generated in response to the submission of the completed login form with the bookmark. Now when the user comes and clicks on the "autologin" icon associated with the bookmark, not only is the site brought up but the login page is autofilled with the correct username, password and the proper default selections (if any) that were recorded in the post login URL stored with each auto loggable bookmark.

Customized Portals

Figure 10:
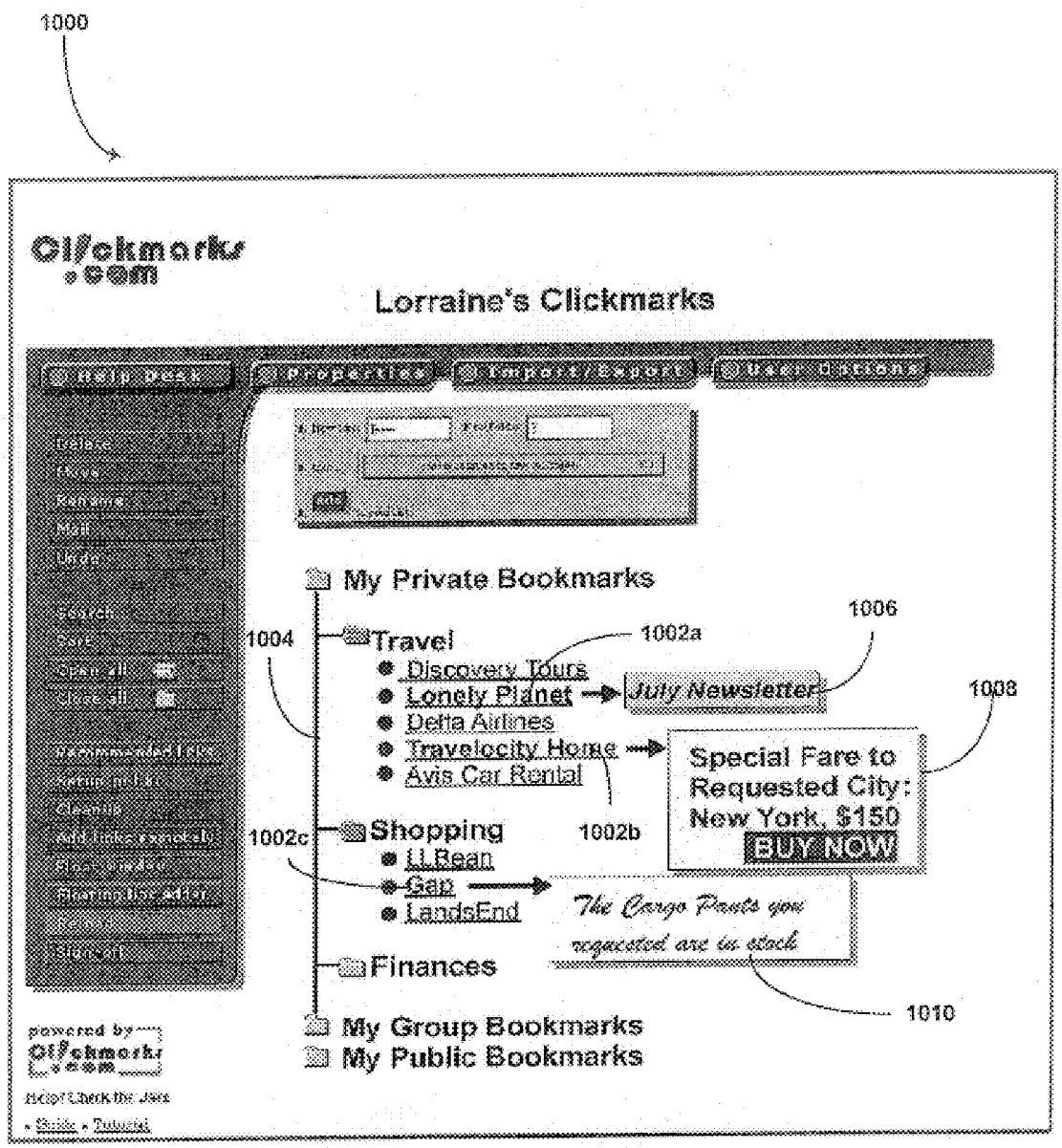
FIG. 10 shows an illustrative display of a customizable portal with programmable bookmarks and output generated from the execution of selected features of the bookmarks in accordance with an embodiment of the present invention.

The created bookmark and output generated from the execution of the selected features may also be displayed as part of a user customized network portal. FIG. 10 shows an illustrative display of such a customizable portal with programmable bookmarks. With such a customized Internet Portals, not just the type of content is customizable but the source of content is customizable as well.

Specifically, using programmable bookmarks, users may create their customized Internet portal: a web page 1000 that displays content and services from websites they select via a compelling Graphical User Interface. Content is pulled off the selected website servers and displayed seamlessly over the user's browser. With reference to FIG. 10, in this illustrative embodiment of a customized portal, a plurality of programmable bookmarks 1002a, 1002b, 1002c are displayed in the customized portal web page. These bookmarks may be displayed in a organized manner such as a organizational tree 1004 Notifications to a user from the selected features of their bookmarks may be displayed in the customized portal. For example, in FIG. 10, a notification frame 1006 resulting from selection of the pushed update feature for a bookmark may be displayed adjacent the particular bookmark 1002a. In another example, a notification frame (such as an advertisement for a sale 1008, or notification that a good that the user ordered is in stock 1010) generated through selection service delivery feature for particular created bookmarks 1002b, 1002c may also be displayed on the web page.

The GUI design may be in Java or ActiveX. Java gives the advantage of being platform independent but is slow. ActiveX requires a onetime download but is much faster there on. However, it restricts one to Windows and Mac machines. The backend database keeping track of the user's programmable bookmarks, etc. may be any sufficiently robust relational database such as Oracle Informix or Sybase.

Enterprise Intranet Portals:

Besides creating portals into the Internet, the "space" into which entry may be customized may also be a corporate intranet or even a large networked site. Entry into and navigation through any user space on the Internet may be customized. The space may be the entire Internet or it may be individual Intranets for instance. Customizing the entry into an intranet for instance could utilize a "guided tour" feature that exposes the user setting up his custom intranet portal to the various parts of the intranet and allows him to choose which portions/pages on the intranet he wishes to link to in his custom portal. The drag and drop paradigm may be employed to allow users to pick and place links to craft their entry into the intranet.

Web site Portals (Customized Entry Into Individual Web Sites)

Large content web sites (e.g. iVillage) with a network of distinct subsites usually have one entry point—the top level page. Most users bookmark pages and sections deep within the site hierarchy as an adhoc means of "customizing" their entry to and navigation through the web site. With the present invention, users of these large content web sites have the ability to set up their very own portal to their favorite content web sites. The mechanism would be similar to that described in setting up an intranet portal.

Although only a few embodiments of the present invention have been described in detail herein, it should be understood that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

We claim:

1. A system for programming a network browser bookmark for delivering information to a user, comprising:
    (a) logic that creates a bookmark for forming a link to a site to access the linked site upon selection of the bookmark;
    (b) logic that selects at least one of a plurality of features for the created bookmark relating to the linked site;
    (c) logic that stores the selected features of the created bookmark; and
    (d) logic that executes the selected features of the created bookmark;
    (e) wherein the features available for selection for the created bookmark include:
        i. a property storing feature;
        ii. an event triggering feature;
        iii. an information communicating feature;
        iv. an alarm feature, wherein the logic for executing the selected features finisher comprises logic for: generating a notification at the set date and time for reminding a user to access the linked site;
        v. a pushed update feature and wherein the logic for executing the selected features further comprises logic for: selecting a periodic interval for receiving updates; and arranging with the linked site for the transmitting of updates at the periodic interval;
        vi. a pulled update feature performed by logic that: selects at least one keyword, periodically monitors tile linked site for the presence of the selected keyword; and generates a notification upon the detection of the selected keyword in the linked site,
        vii. a content change detecting feature performed by logic for: monitoring content of tile linked site for changes in the content, and generating a notification upon the detection of a change in the content;
        viii. a content delivery feature performed by logic for: extracting content from the linked site, and generating output which includes the extracted content; and
        ix. a service delivery feature performed by logic for: extracting sales information from the linked site; and generating output which includes the extracted sales information.

2. The system as set forth in claim 1, wherein the alarm feature is further executed by logic that sets a. date and time.

3. The system as set forth in claim 1, wherein the pushed update feature allows the user to set the periodic internal.

4. The system as set forth in claim 1 wherein the pulled update feature queries the user to input the at least one keyword.

5. A computer program embodied on a computer readable medium for programming a network browser bookmark for delivering information to a user, comprising:
    (a) a code segment that creates a bookmark for forming a link to a site to access the linked site upon selection of the bookmark:
    (b) a code segment that selects at least one of a plurality of features for the created bookmark relating to the linked site;
    (c) a code segment that stores the selected features of the created bookmark; and
    (d) a code segment that executes the selected features of the created bookmark;
    (e) wherein the feature-s available for selection for the created bookmark include:
        i. a property storing feature;
        ii. an event triggering feature;
        iii. an information communicating feature;
        iv. an alarm feature,
        v. a pushed update feature;
        vi. a pulled update feature;
        vii. a content change detecting feature;
        viii. a content delivery feature; and
        ix. a service delivery feature.

6. The computer program as set forth in claim 5, wherein the alarm feature Other comprises a code segment that generates a notification at a set date and time for reminding a user to access the linked site.

7. The computer program as set forth in claim 5, wherein the pushed update feature further comprises: a code segment that selects a periodic interval for receiving updates; and a code segment that arranges with the linked site for the transmitting of updates at the periodic interval.

8. The computer program as set forth in claim 5, wherein the pulled update feature further comprises: a code segment that selects at least one keyword, a code segment that periodically monitors the linked site for the presence of the selected keyword; and a code segment that generates a notification upon the detection of the selected keyword in the lined site.

9. The computer program as set forth in claim 5, wherein the content change detecting feature further comprises: a code segment that monitors content of the linked site for changes in the content; and a code segment that generates a notification upon the detection of a change in the content.

10. The computer program as set forth in claim 5, wherein the content delivery feature further comprises: a code segment that extracts content from the linked site, and a code segment that generates output which includes the extracted content.

11. The computer program as set forth in claim 5, wherein the service delivery feature further comprises: a code segment that extracts sales information from the linked site; and a code segment that generates output which includes the extracted sales information.

12. The computer program as set forth in claim 1, further comprising a code segment that displays the created bookmark and output generated from the execution of the selected features of the created bookmark.

13. A method for programming a network browser bookmark for delivering information to a user, comprising:
    (a) creating a bookmark forming a link to a site to access the linked site upon selection of the bookmark;
    (b) selecting at least one of a plurality of features for the created bookmark relating to the linked site;
    (c) storing the selected features of the created bookmark; and
    (d) executing the selected features of the created bookmark.
    (e) wherein the features available for selection for the created bookmark include:
        i. a property storing feature for storing properties;
        ii. an information communicating feature for communicating information to a user;
        iii. an event triggering feature for triggering an event; and
        iv. a service delivery feature.

14. The method as set forth in claim 1, wherein the features include an alarm feature, and wherein the step of executing the selected features further comprises the steps of: setting a date and time; and generating a notification at the set date and time for reminding a user to access the linked site.

15. The method as set forth in claim 1, wherein the features include a pushed update feature and wherein the step of executing the selected features further comprises the steps of: selecting a periodic interval for receiving updates; and arranging with the linked site for the transmitting of updates at the periodic interval.

16. The method as set forth in claim 1, wherein the features include a pulled update feature comprising the steps of: selecting at least one keyword, periodically monitoring the linked site for the presence of the selected keyword; and generating a notification upon the detection of the selected keyword in the linked site.

17. The method as set forth in claim 1, wherein the features include a content change detecting feature comprising the steps of: monitoring content of the linked site for changes in the content; and generating a notification upon the detection of a change in the content.

18. The method as set forth in claim 1, wherein the features include a content delivery feature comprising the steps of: extracting content from the linked site, and generating output which includes the extracted content.

19. The method as set forth in claim 1, wherein executing the service delivery feature comprises the steps of: extracting sales information from the linked site; and generating output which includes the extracted sales information.

20. The method as set forth in claim 1, further comprising the step of displaying the created bookmark and output generated from the execution of the selected features of the created bookmark.

21. A method for programming a network browser bookmark for delivering information to a user, comprising:
    (a) receiving a user command to create a bookmark to a site;
    (b) creating a bookmark for forming a link to a site to access the linked site upon selection of the bookmark;
    (c) storing the bookmark on a remote network server;
    (d) storing a local bookmark on a client computer of a user;
    (e) calling the bookmark stored on the remote network server upon detecting user selection of the local bookmark;
    (f) selecting at least one of a plurality of features for the created bookmark relating to the linked site;
    (g) receiving user input for tailoring the features;
    (h) storing the selected features of the created bookmark;.
    (i) initiating the crated bookmark;
    (j) executing the selected features of the created bookmark;
    (k) displaying the created bookmark;
    (l) displaying output generated from the execution of the selected features of the created bookmark;
    (m) wherein the features available for selection for the created bookmark include:
        i. a property storing feature;
        ii. an event triggering feature;
        iii. an information communicating feature;
        iv. an alarm feature, wherein the step of executing the selected features further comprises the steps of setting a date and time; and generating a notification at the set date and time for reminding the user to access the biked site;
        v. a pushed update feature and wherein the step of executing the selected features further comprises the steps of: selecting a periodic interval for receiving updates; and arranging with the linked site for the transmitting of updates at the periodic interval;
        vi. a pulled update feature comprising the steps of: selecting at least one keyword, periodically monitoring the linked site for the presence of the selected keyword; and generating a notification upon the detection of the selected keyword in the linked site;
        vii. a content change detecting feature comprising the steps of: monitoring content of the linked site for changes in the content; and generating a notification upon the detection of a change in the content
        viii. a content delivery feature comprising the steps of: extracting content from the linked site, and generating output which includes the extracted content; and
        ix. a service delivery feature comprising the steps of: extracting sales information from the inked site; and generating output which includes the extracted sales information.

\* \* \* \* \*